Aug. 3, 1943.      I. E. BORCHERS      2,325,654
CORN SHELLER
Filed Dec. 23, 1939      2 Sheets-Sheet 1
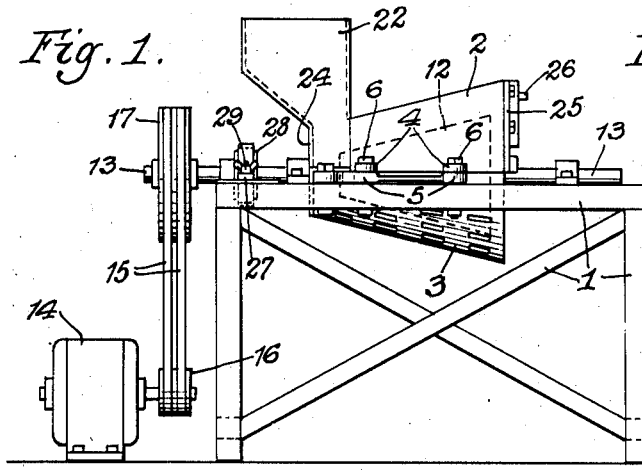
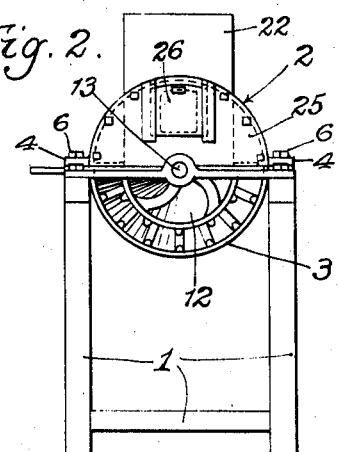
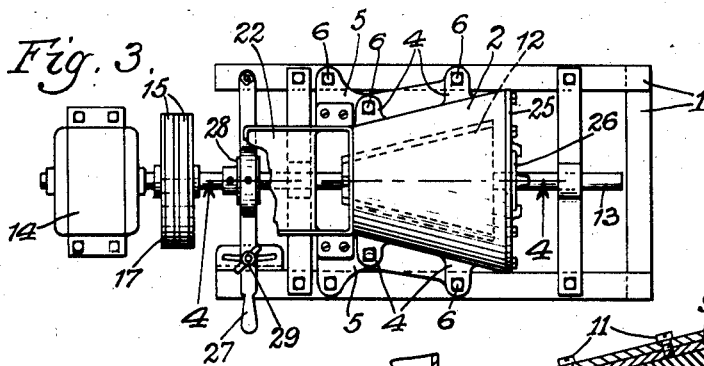
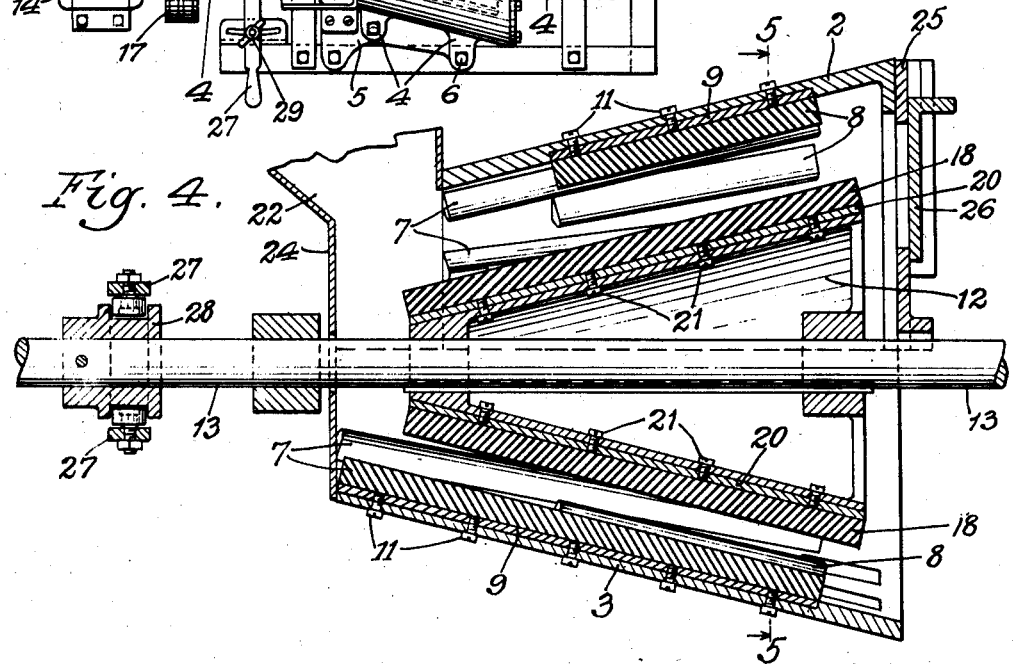
INVENTOR.
Irvin E. Borchers.
BY
Parker & Carter
ATTORNEYS.

Aug. 3, 1943.  I. E. BORCHERS  2,325,654
CORN SHELLER
Filed Dec. 23, 1939  2 Sheets-Sheet 2
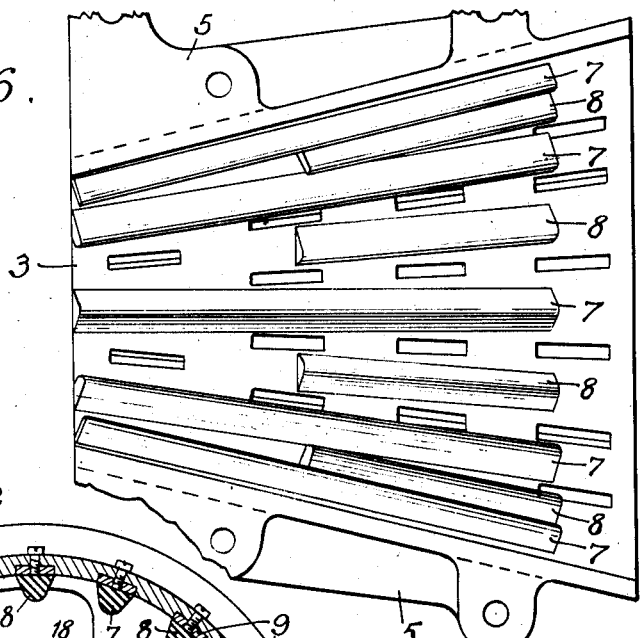
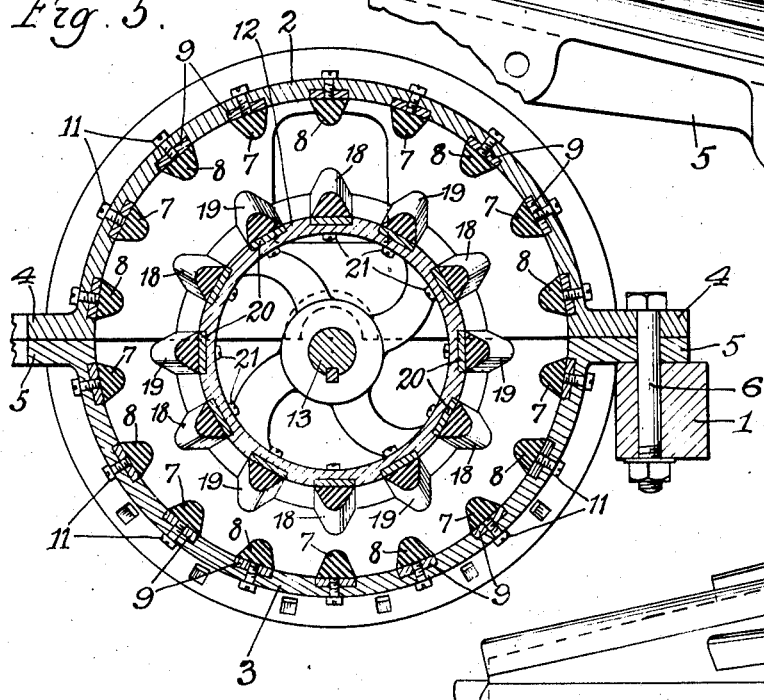
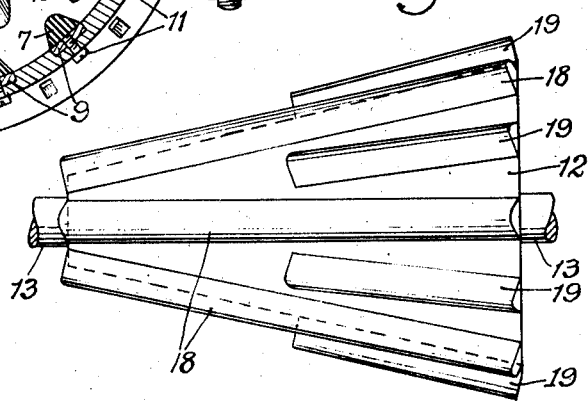
INVENTOR.
Irvin E. Borchers
BY Parker & Carter
ATTORNEYS.

Patented Aug. 3, 1943

2,325,654

UNITED STATES PATENT OFFICE 2,325,654

CORN SHELLER

Irvin E. Borchers, La Fayette, Ind., assignor to De Kalb Agricultural Association, Inc., De Kalb, Ill., a corporation of Delaware Application December 23, 1939, Serial No. 310,842

1 Claim. (Cl. 130—6)

This invention relates to corn shellers and has for its object to provide a new and improved device of this description. The invention has as a further object to provide a corn sheller particularly adapted to be used for shelling seed corn. Heretofore the devices for shelling seed corn have caused damage to the seed corn. The present invention has for its object to provide a corn sheller for seed corn which substantially eliminates the damage to the seed corn. The invention has further objects which are more particularly pointed out in the accompanying description.

One form of the device is illustrated in the accompanying drawings, wherein

Fig. 1 is a side elevation of one form of corn sheller embodying the invention;

Fig. 2 is an end view showing the discharge end of the corn sheller illustrated in Fig. 1;

Fig. 3 is a plan view of Fig. 1;

Fig. 4 is an enlarged sectional view taken on line 4—4 of Fig. 3;

Fig. 5 is a sectional view taken on line 5—5 of Fig. 4;

Fig. 6 is an interior view of the bottom portion of the outside stationary member; and Fig. 7 is a plan view of the inside rotating member.

Like numerals refer to like parts throughout the several figures.

Referring now to the drawings, wherein one form of device embodying the invention is illustrated, there is a frame 1 of any suitable type. Mounted upon the frame 1 is a hollow cone shaped member made up of the two elements 2 and 3. These elements have flanges 4 and 5 which are fastened together by the bolts or fastening devices 6, such fastening devices also preferably fastening them to the frame 1. These elements when placed together form a hollow cone into which the corn is received.

On the interior of the elements 2 and 3 are a series of projections 7 of non-metallic material, preferably rubber, and which preferably extend the greater portion of the length of the elements. Intermediate these projections 7 are projections 8 of similar material, which extend only part way along the elements, as clearly shown in Fig. 6. These projections may be formed in any desired manner and attached in position in any desired manner. As herein shown, these projections consist of metal strips 9 with the rubber projections 7 and 8 attached thereto. One way of doing this is to deposit copper electrolytically on the metal strips and causing the rubber to adhere to this copper. The strips are fastened in position in any desired manner, as by the fastening devices 11. The rubber projections are preferably rounded as illustrated.

Located within the cone shaped enclosure made by the elements 2 and 3 is a cone shaped member 12 which is also preferably hollow. Some means is provided for rotating the member 12. As herein shown the member 12 is attached to a shaft 13, which shaft is driven in any suitable manner, as by a motor 14 and the belt 15 running over pulleys 16 and 17. The rotating cone shaped member 12 is also provided with projections 18 which extend substantially the entire length of the cone and the intermediate projections 19 which extend only part way along the cone. These projections are made of non-metallic material, such as rubber, and are preferably similar to the projections attached to the elements 2 and 3. That is, they have the metal strips 20 to which the rubber projections are attached, these metal strips being fastened to the rotating cone shaped member 12 by means of the fastening devices 21.

The front end of the device is provided with some means for inserting the corn. As herein shown, there is a hopper 22 which has the open end in which the corn is inserted and which is provided with a wall 24 which closes the front end of the device. At the discharge end of the device there is an end wall 25 which preferably only extends along the end of the element 2 and which has a door 26 which covers an opening communicating with the interior of the element 2. The end of the element 3 is open and it is through this opening that the shelled corn and cobs are discharged together, but no longer clinging to each other, and are separated by further operations.

It will be noted that there is here provided a corn shelling device having an inner cone shaped member connected with a rotatable shaft and having on its outer face a plurality of non-metallic pliable projections, and an outer hollow cone shaped member surrounding the inner cone shaped member and having non-metallic pliable projections on its inner surface. The pliable projections engage the corn as the inner cone shaped member is rotated and because of the fact that they are flexible or pliable, they do not strike the corn a hard blow, but gradually apply pressure and friction thereto and push or wipe the grains of corn from the cob, so that no substantial injury is done to these grains.

The cone 12 is adjusted endwise in the cone-shaped enclosure 2 and 3 by means of the hand lever 27 engaging a collar 28 on the shaft 13. This adjustment is provided to adapt the device for variable sized ears of corn. A set screw 29 holds the lever 27 in any desired position.

The use and operation of my invention are as follows.

The seed corn to be shelled is placed in the hopper 22 and then passes into the interior of the device and in between the elements 2 and 3 and the rotating member 12. This rotating member 12 is rotated and the ears of corn passing between the elements 2 and 3 and the member 12, are moved circumferentially because of the projections 18 and 19 on the member 12, and the grains of corn, instead of being knocked loose from the cob and thereby damaged, as has been heretofore the case, are rubbed loose from the cob by the friction of the projections 7, 6, 18 and 19, without damaging the grains.

I claim:

A corn sheller comprising two horizontally extending relatively movable hollow cone-shaped members, one within the other with a space between them, into which the ears of corn are received, a closing end wall at one end of said cone-shaped members for closing the end of the space between them, a side feed opening in said wall for feeding the ears of corn into the space between said cone-shaped members, a horizontal shaft to which the inner member is connected, continuous non-metallic flexible projections on said members extending longitudinally therealong and converging toward said shaft and projecting into the space between said members, the outer cone-shaped member being of metal, a portion of the inner metal face of which is exposed between the non-metallic flexible projections extending therealong, said projections elastically engaging the grains of corn while on the cob and rubbing them off the cob without any substantial damage to the grains of corn.

IRVIN E. BORCHERS.